Nov. 2, 1943.  S. BRAND ET AL  2,333,461
RECORD CARD PUNCHING MACHINE
Filed Sept. 23, 1942   10 Sheets-Sheet 1
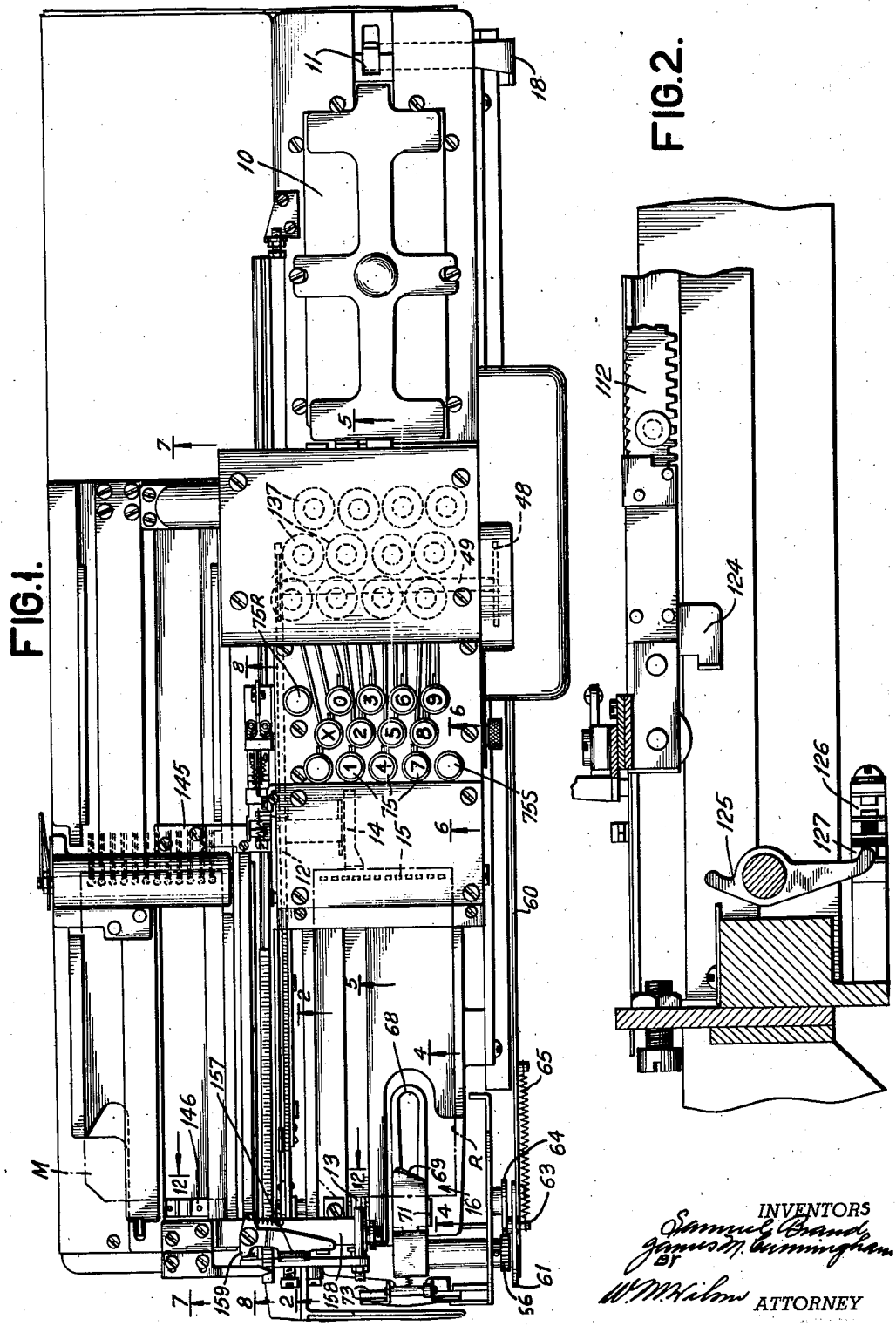

Nov. 2, 1943.      S. BRAND ET AL      2,333,461
RECORD CARD PUNCHING MACHINE
Filed Sept. 23, 1942    10 Sheets-Sheet 2

INVENTORS
Samuel Brand
James M. Cunningham
BY
W. M. Wilson  ATTORNEY

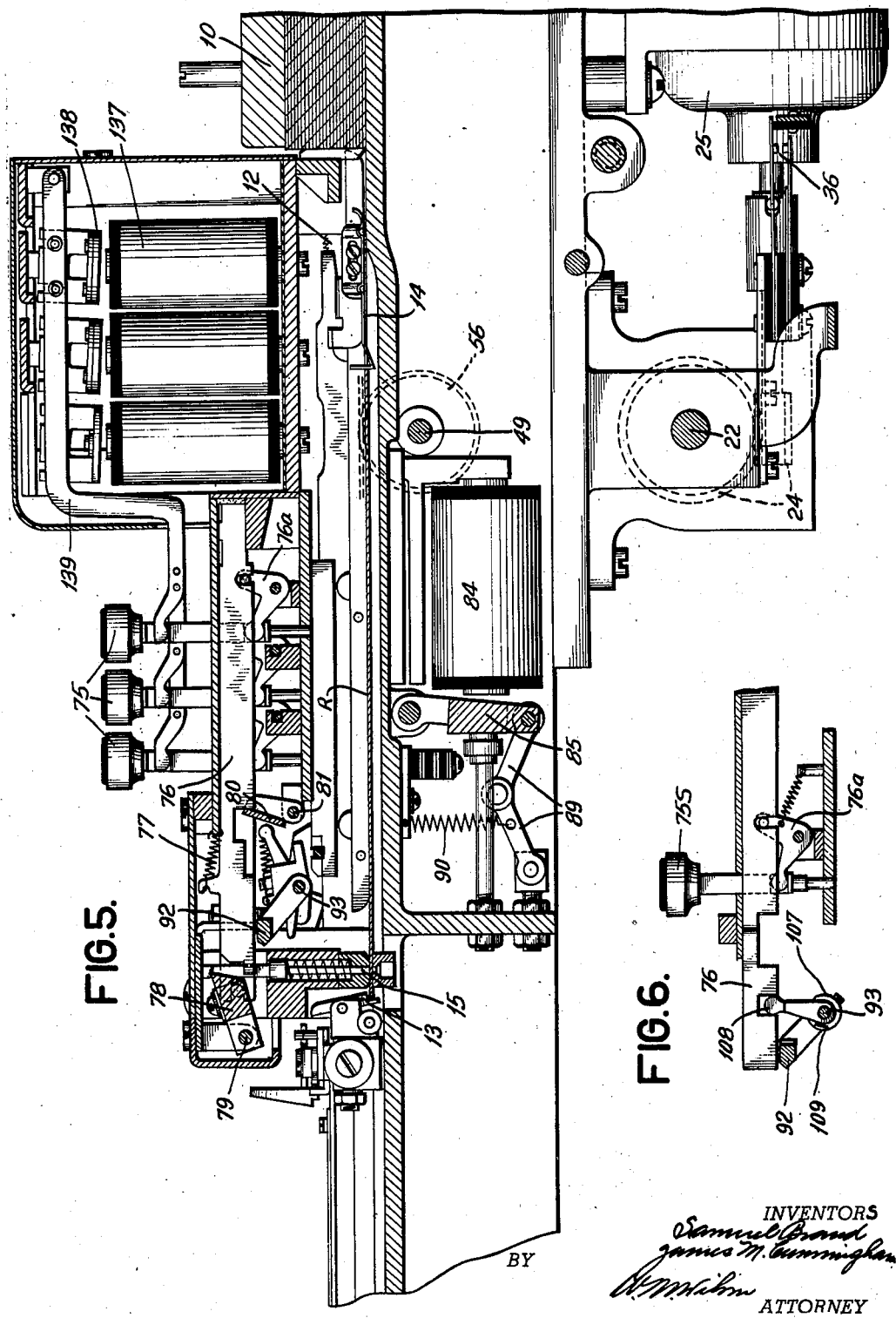

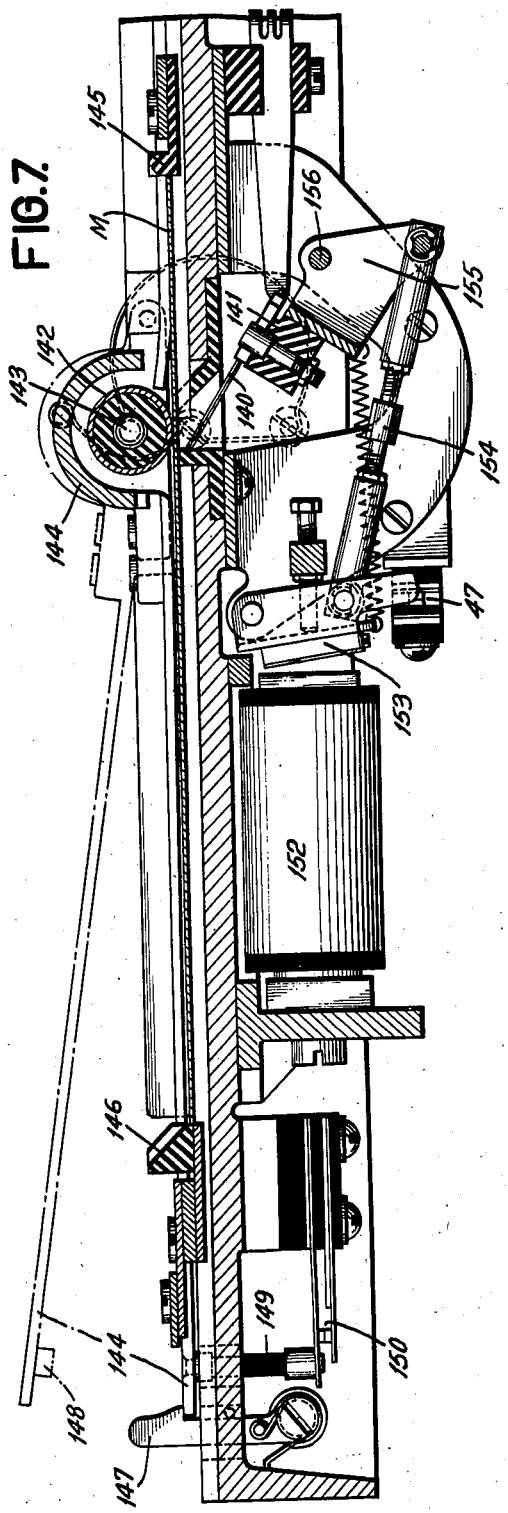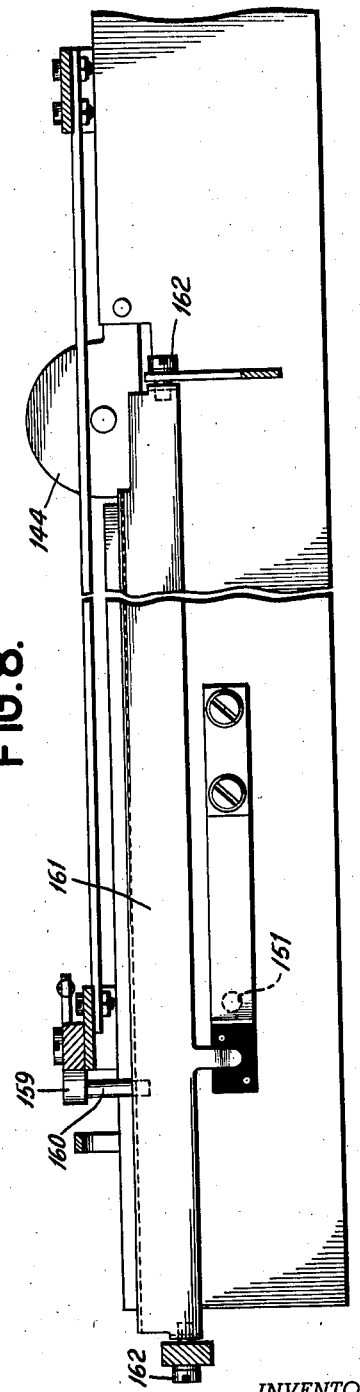

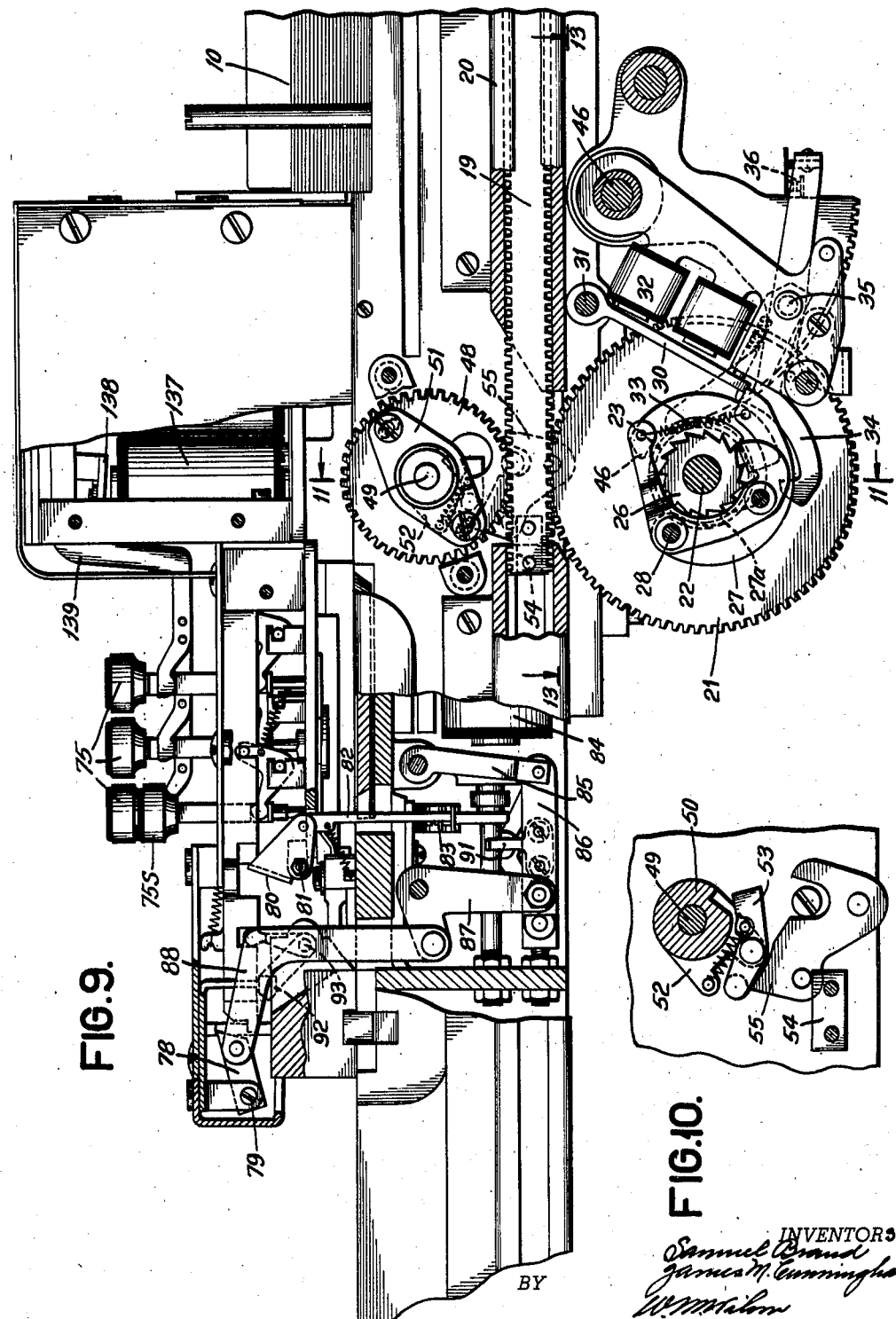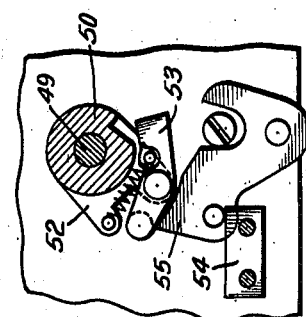

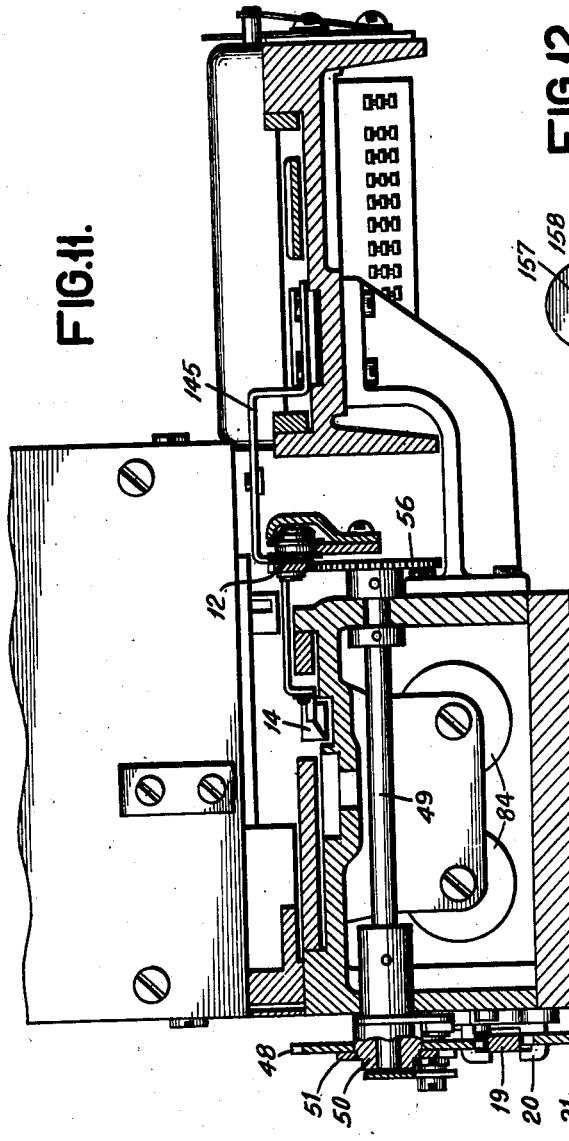
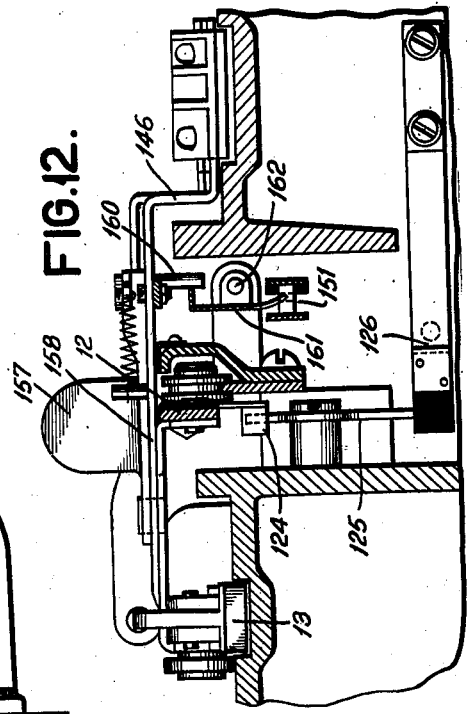

Nov. 2, 1943.  S. BRAND ET AL  2,333,461
RECORD CARD PUNCHING MACHINE
Filed Sept. 23, 1942  10 Sheets-Sheet 7

INVENTORS
Samuel Brand
James M. Cunningham
BY
ATTORNEY

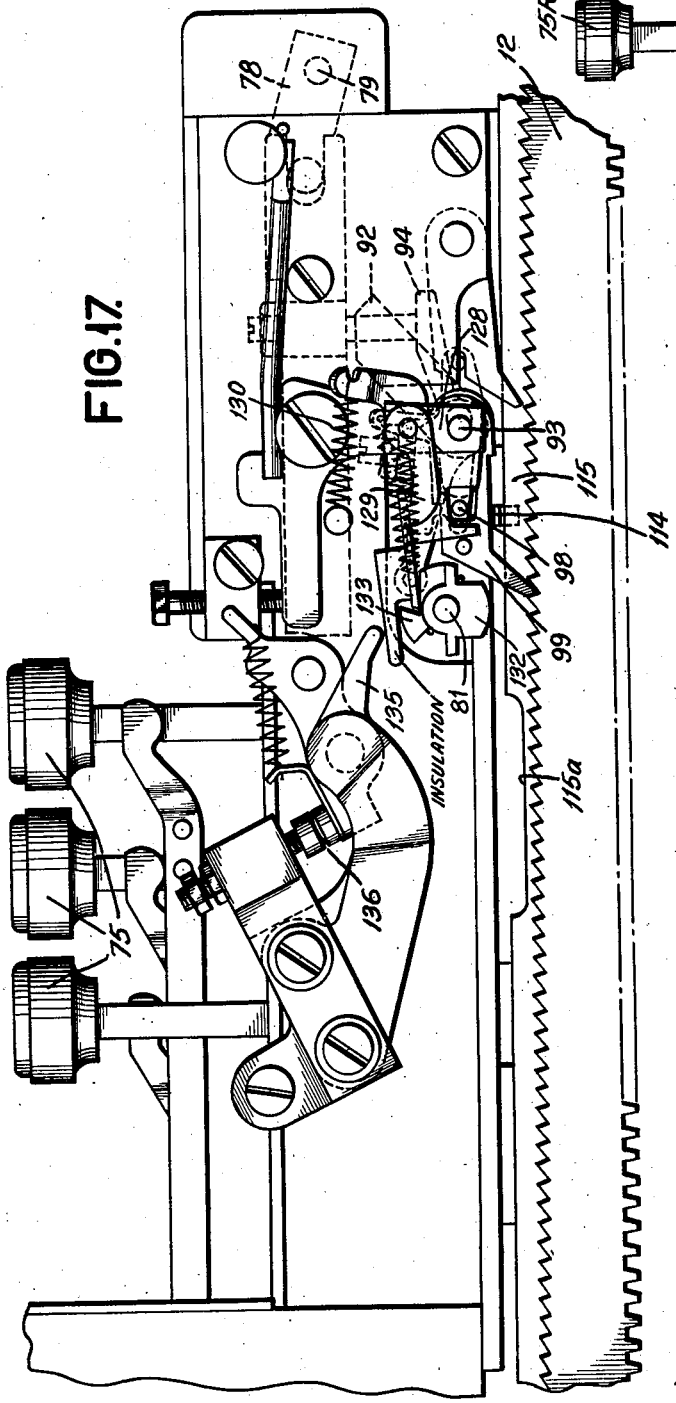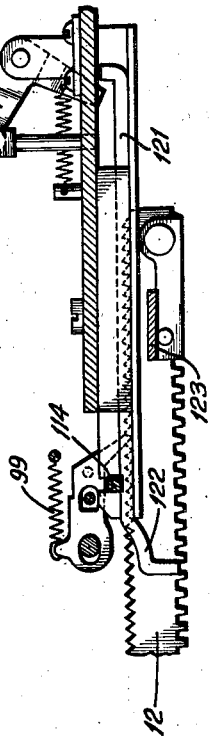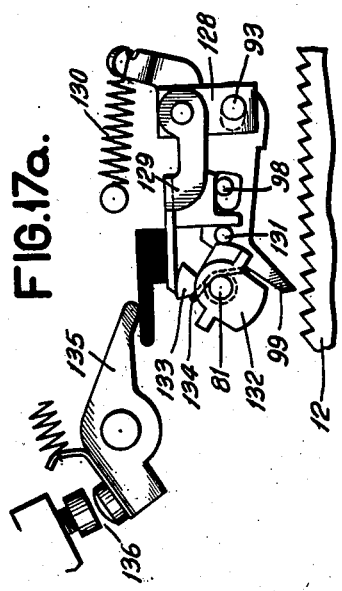

Nov. 2, 1943.　　　S. BRAND ET AL　　　2,333,461
RECORD CARD PUNCHING MACHINE
Filed Sept. 23, 1942　　10 Sheets-Sheet 10

Patented Nov. 2, 1943

2,333,461

UNITED STATES PATENT OFFICE 2,333,461

RECORD CARD PUNCHING MACHINE

Samuel Brand, Binghamton, and James M. Cunningham, Endicott, N. Y., assignors to International Business Machines Corporation, New York, N. Y., a corporation of New York Application September 23, 1942, Serial No. 459,402

9 Claims. (Cl. 164—112)

This invention concerns punching machines and more particularly the duplicating type, and has for its general object the provision of certain improvements whereby the efficiency of the punching machine has been substantially increased. In punching machines of this type, there are provided separate mechanisms employed in traversing a card through the machine, these being known as card picker mechanism, card carriage mechanism, and card ejecting mechanism.

Heretofore, these mechanisms operated in sequence, that is, the picker mechanism advanced the card from the hopper to the card carriage which thereafter advanced the card step by step or column by column past a row of devices. After all the card columns had traversed the row of punches, the ejector mechanism came into operation to eject the card from the machine into a discharge hopper and, upon completion of the ejecting operation, the picker mechanism was again brought into place to repeat the cycle of events.

It is an object of the present invention to provide mechanism whereby the operation of the card picker mechanism will take place concurrently with the action of the ejecting mechanism so that, while a punched card is being ejected, a new card is brought into position to receive punching. This arrangement has materially reduced the overall operating time of the machine and greatly increased its efficiency.

A further object of the invention resides in the provision of improved mechanism for operating the card picker and carriage mechanism so that, when they start from a rest position, their movement is gradually accelerated, thereby reducing jarring and noise and attaining better operating speeds.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the machine showing the relationship between the several units thereof.

Fig. 2 is a detail looking at the direction of line 2—2 of Fig. 1, showing the so-called "last column" contacts and the mechanism for operating them.

Fig. 5 is a central section through the punch selecting and operating mechanism, the view looking in the direction of line 5—5 of Fig. 1.

Fig. 6 is a detail of the space key and its connected mechanism, the view looking generally in the direction of line 6—6 of Fig. 1.

Fig. 7 is a section through the pattern or master card sensing unit, the section being taken along line 7—7 of Fig. 1.

Fig. 8 is a view showing the so-called "column cutout" contacts and their operating mechanism. This view is taken along the line 8—8 of Fig. 1.

Fig. 9 is an enlarged view of the outside of the card punching mechanism with the casing broken away to show the interior construction.

Fig. 10 is a detail of parts shown in dotted lines in Fig. 9.

Fig. 11 is a section looking in the direction of line 11—11 of Fig. 9, showing the card carriage driving and coupling devices.

Fig. 12 is a view looking in the direction of line 12—12 of Fig. 1, showing the card carriage supporting mechanism.

Fig. 17 is a view of the escapement mechanism, the view being taken in the opposite direction to that of Fig. 3.

Fig. 17a is a detail of parts in Fig. 17 shown in operated position.

Fig. 18 is a detail of the carriage release key and its associated mechanism.

Figure 4:
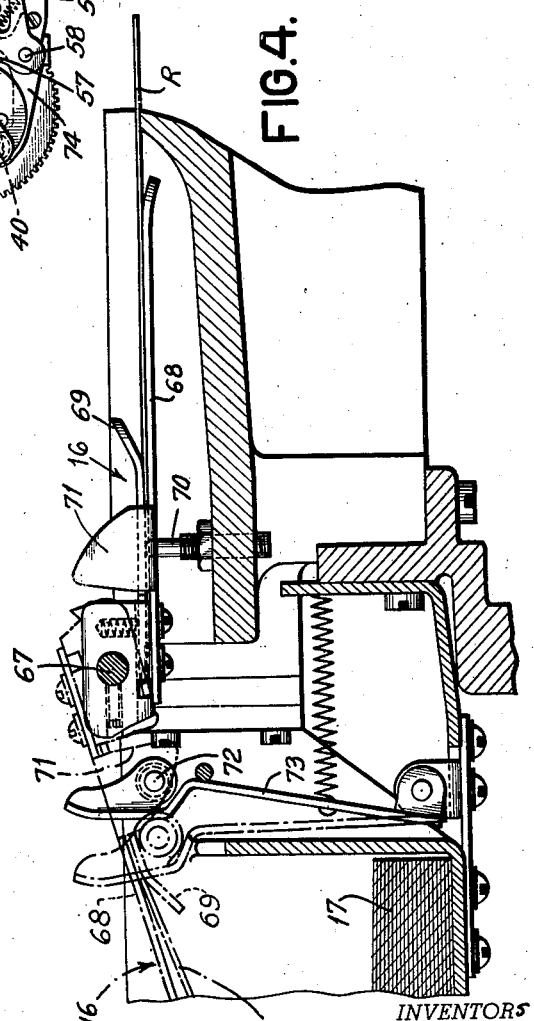
Fig. 4 is a detail section looking in the direction of line 4—4 of Fig. 1, showing the card ejecting device.

Referring to Fig. 1, cards to be punched are placed in a hopper 10 and from here they are fed singly from the bottom of the stack by the usual picker 11 which advances the card to the card carriage. This card carriage comprises a rack 12 from which extends the card stop 13 at the left end and a card pusher 14 at the right end (see also Fig. 5). The pusher 14 is made of resilient material so that, as the bottommost card is moved from the hopper 10 toward the left as viewed in Fig. 5, it will pass beneath the pusher 14 causing the latter to flex upwardly and let the card pass by. When the trailing edge of the card has been advanced sufficiently, the left hand or free end of the pusher 14 will snap down behind the card into the position shown and will serve to advance the card toward the left from the position shown in Fig. 5. This advance toward the left, as will be explained, is effected step by step so as to present the columns of the card in succession to a row of punches 15. When the last column is in punching position, it will occupy the position shown in broken lines in Fig. 1 where it is designated R, and in such position the leading edge of the card will be between the jaws of the ejector generally designated 16, which jaws serve to swing the card in a counterclockwise arc as viewed in Fig. 4 and deposit it in a hopper designated 17. The operation of picking the card from the bottom of the hopper 10, advancing it step by step past the row of punches 15, and ejecting it from the last column position into the hopper 17 are coordinated through the mechanism which will now be specifically explained.

Figure 3:
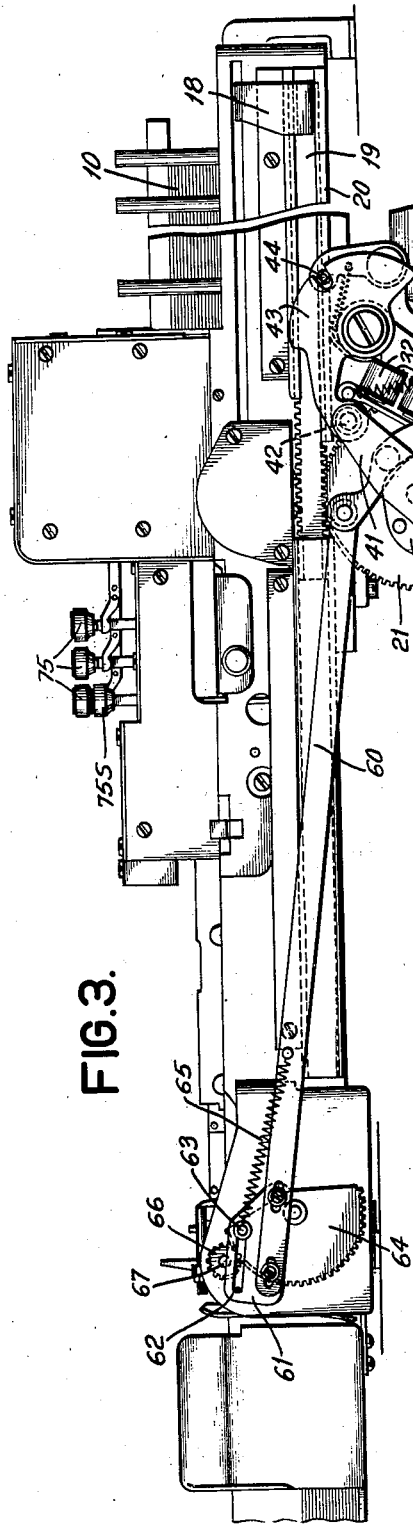
Fig. 3 is a front view of the machine.

The picker 11 is carried by an arm 18 secured to the right end of a rack 19 (see Fig. 3). This rack 19 is guided for reciprocation in a suitable channel 20 and has teeth in its lower edge meshing with a gear 21 (see also Figs. 9 and 11), which gear is freely mounted on the shaft 22 and which has integral therewith a smaller gear 23. Shaft 22 is driven through worm and wheel connection 24 by a motor 25 (see Fig. 5) so that, when the motor is in operation, shaft 22 operates to rotate a clutch driving ratchet 26 (see Fig. 9) which is pinned to the shaft. In the plane of driving ratchet 26 is a dog 27 (Figs. 9 and 13) which is pivoted at 28 to a cam 29. The free end of the dog 27 normally abuts the end of an armature 30 which is pivoted at 31. When magnet 32 is energized, the armature 30 is attracted to the position of Fig. 14, thereby releasing the dog 27 for counterclockwise rotation about pivot 28 under the influence of a spring 33, whereupon the single tooth 27a of the dog will engage ratchet 26 and be rotated thereby in a counterclockwise direction.

Figure 13:
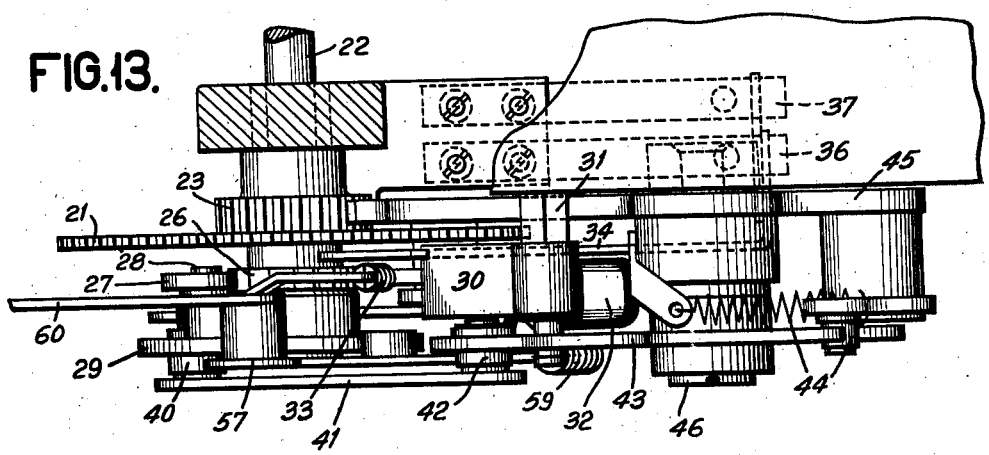
Fig. 13 is a view taken along the line 13—13 of Fig. 9.
Figure 14:
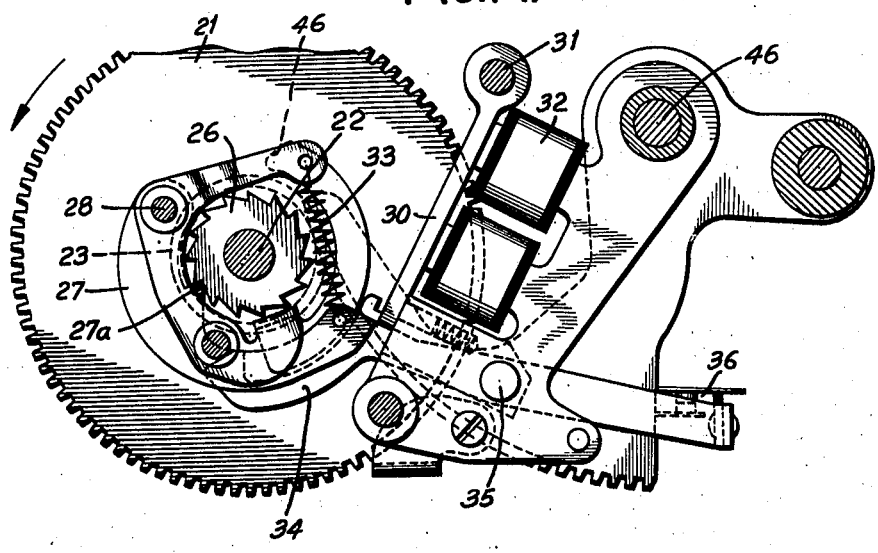
Fig. 14 is a detail of the clutch mechanism of Fig. 9 with certain of the parts in operated position.

The magnet armature 30, when in normal position (Fig. 9), engages a lever 34 pivoted at 35 to hold the lever in the position shown in Fig. 9, where its right hand extremity holds a pair of contacts 36 in open position and another pair of contacts 37, directly behind, in closed position (see Fig. 13). These two pairs of contacts 36 and 37 are shown in circuit diagram (Fig. 19) where it will be seen that, when contacts 36 close, a circuit is completed from one side of line 38, through the contacts 36, and motor 25, to a pair of normally closed contacts 47 to opposite side of line 39. The motor 25 is constantly in operation at reduced speed through a circuit from line 38, a variable resistor 100, motor 25 to contacts 47, to line 39. Resistor 100 is adjusted to keep the motor running at reduced speed until contacts 36 shunt out the resistor and the motor then runs at high speed. Briefly, then, the motor 25 is run at slow speed until the magnet 32 is energized to close contacts 36. When magnet 32 is energized, it releases lever 34 so that the latter may rock from the position in Fig. 9 to that of Fig. 14, being urged to do so by the tension of the upper blade of contacts 36.

With coupling of the dog 27 and ratchet 26 effected as explained, cam 29 turns counterclockwise carrying therewith a pin 40 (Figs. 3 and 15) to which there is pivoted a link 41. The opposite end of this link is pivoted at 42 to member 43 which has a safety pin-and-slot and spring connection 44 with a sector 45 pivoted on the stud 46. Sector 45 has teeth meshing with the gear 23 so that through the mechanism traced the gears 23 and 21 will be rotated counterclockwise and then back again, while the cam 29 makes one complete revolution. The parts are shown in their normal or home position in Fig. 3 and in Fig. 15 they are shown after the cam 29 has made a half revolution.

The cam 29 carries a finger 46 which, after the cam has made a half revolution, will engage the left end of lever 34 rocking it back to its position of Fig. 9 and thereby opening contacts 36 again. This cuts the resistor 100 into the motor circuit again and the second half revolution is completed at reduced speed. It has been found that resistor 100 may be omitted, in which case the motor is started when contacts 36 close and stopped after the 180° movement when contacts 36 open again. Under such conditions the inertia of the parts carries them through the second half revolution back to home position.

When the revolution of cam 29 is completed, the dog 27 engages the free end of armature 30 which is now in its non-attracted position, and as a result the tooth 27a is disengaged from the driving ratchet 26 and the parts are back in the starting position of Figs. 3 and 9.

It will be noted that during the first half revolution of cam 29 the sector 45 drives gear 21 counterclockwise and then back again to its initial position, and the gear 21 accordingly effects a reciprocation of the card picker rack 19 to advance a new card from hopper 10 to the card position of Fig. 5.

The upper edge of rack 19 has teeth meshing with a gear 48 which is freely mounted on a hub of a cam 50 which is free on a cross shaft 49 (see Figs. 9, 10 and 11). A plate 51 integral with cam 50 is adjustable with respect to gear 48 so that a slight relative angular adjustment may be made between the cam and gear and the two secured together by tightening of the screws in the ends of plate 51.

Secured to cross shaft 49 is an arm 52 (see also Fig. 10) to which is pivoted a spring-pressed dog 53. When rack 19 is in its right hand position as viewed in Fig. 9, a block 54 riveted thereto engages and holds a cam lever 55 in the position of Fig. 10 where the lever engages the dog 53 to hold it out of engagement with the notch in cam 50. The action is such that, when rack 19 is moved toward the left as explained, gear 48 and cam 50 are rotated clockwise and block 54 moves away from and allows lever 55 to rock counterclockwise, whereupon dog 53 rocks into engagement with the notch in cam 50 so that a coupling is effected through which the cross shaft 49 is also rotated clockwise as long as rack 19 continues to move toward the left. The parts are so proportioned that shaft 49 is given a complete rotation during the advance stroke of rack 19 and on its return stroke cam 50 returns to its initial position, leaving the shaft 49 advanced. Near the end of the stroke, block 54 raises lever 55 back to the position of Fig. 10 and therewith dog 53 is rocked out of engagement with cam 50.

During the subsequent punching operations, shaft 49 is stepped counterclockwise while cam 50 remains stationary and for this reason lever 55 is configured to hold dog out of engagement with the cam for a short period, until its engaging end has passed over the cam notch.

Referring to Fig. 11, the opposite end of shaft 49 has pinned thereto a gear 56 meshing with teeth in the lower edge of carriage rack 21 so that, when rack 19 is moved toward the left, carriage rack 12 moves in the opposite direction to the position of Fig. 5 where it receives the card advanced by the picker 11. Rack 19 returns to its starting position without accompanying return of rack 12, which latter rack is subsequently advanced step by step during punching operations.

Referring now to Fig. 3, the cam 29 cooperates with a roller in a follower arm 57 pivoted at 58 and held in contact with the cam by a spring 59. At its free end arm 57 is connected to a link 60 whose opposite end carries a plate 61 provided with a slot 62 in which a pin 63 fast on a gear sector 64 extends.

Figure 15:
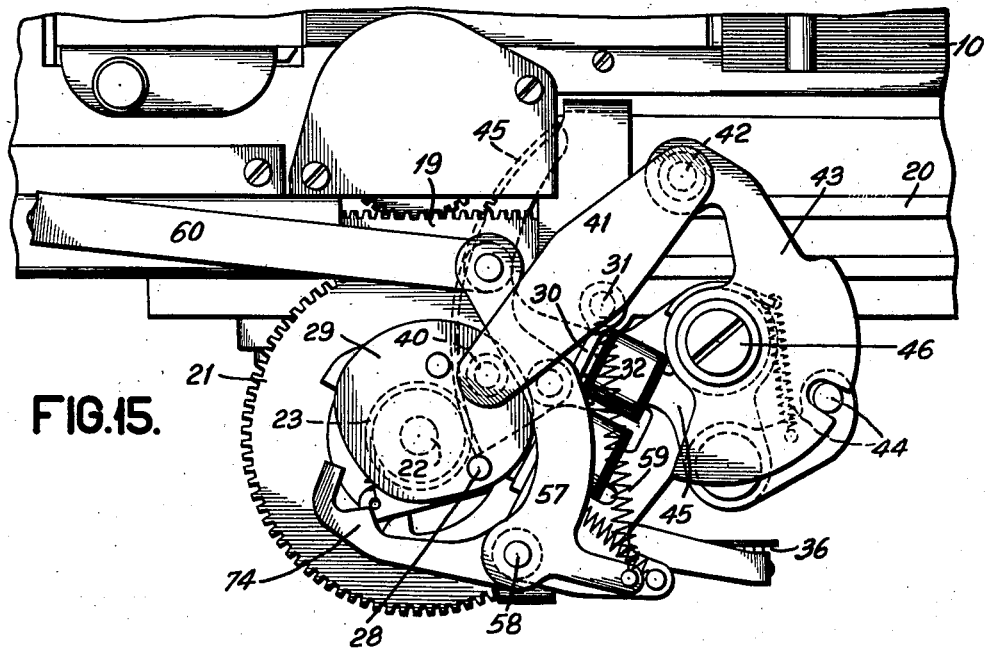
Fig. 15 is a further detail of the clutch mechanism of Fig. 3 with the parts in operated position.

During the first half revolution of cam 29, it rocks arm 57 clockwise to the position shown in Fig. 15 with the result that link 60 (Fig. 3) is drawn to the right and through the safety spring connection 65 to pin 63, the sector 64 is rocked clockwise and in turn rotates pinion 66 counterclockwise. This pinion 66 is secured to rod 67 upon which the ejector jaws designated generally as 16 (Fig. 4) are secured, so that rotation of pinion 66 will rock the jaws to the dotted line position of Fig. 4 and the card R will be rocked therewith. The ejector comprises a fixed jaw 68 and a spring pressed jaw 69 normally held slightly apart by a pin 70 which passes through jaw 68 to engage jaw 69 to allow the leading edge of the card R to enter the jaws. Jaw 68 has a turned up camming projection 71 which serves as a stop for the leading edge of the card and, when the jaws swing to their dotted line position, cam projection 71 engages a roller 72 in a spring pressed pivoted arm 73 to rock the latter counterclockwise to the dotted position shown.

Figure 16:
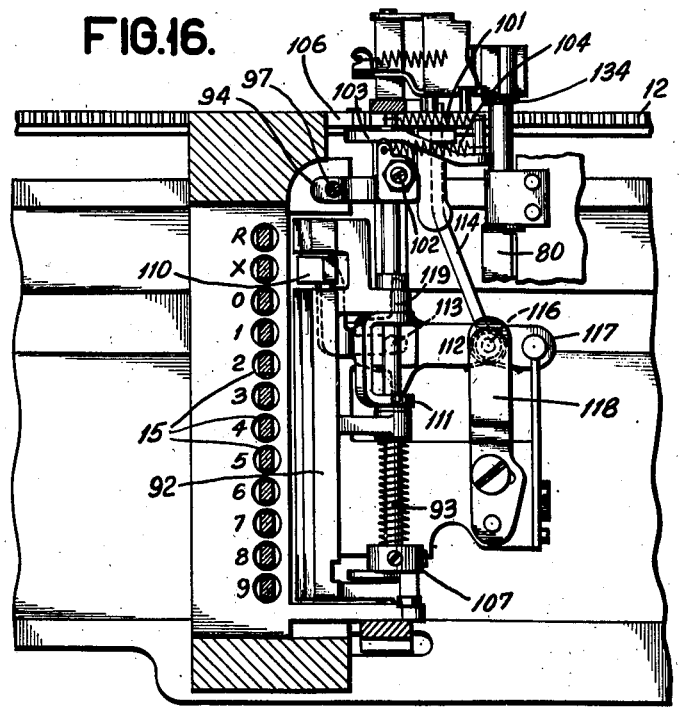
Fig. 16 is a detail of the card carriage escapement control mechanism.

It is to be noted that as soon as the ejector starts its movement, the jaws 68, 69 grip the card and hold it firmly as the jaws rotate. The arm 73 when rocked has its upper end forced against the card edge to slide the card out of the jaws 68, 69 so that it may drop into the hopper 17. During the second half revolution of cam 29, link 60 returns to the position of Fig. 3 and through the connections traced, swings the jaws back to their card receiving position. The present card ejecting mechanism is an improvement over the prior art arrangement shown in Patent No. 1,976,618 in Fig. 16 thereof. A particular point of improvement lies in the cam operation of the ejector jaws whereby a smoother controlled action is obtained. This, together with the provision of a long jaw 68 causes rocking of the card R with practically no bending of the card and enables the use of less spring pressure on the jaw 69, so that it is not necessary to open the jaws when they occupy their broken line position of Fig. 4, and the card is pushed into the hopper 17 with little frictional resistance.

From the foregoing explanation, it is seen that when a card is in its "last column position," energization of magnet 32 will initiate a series of operations in which a card is ejected and, while it is being rocked into the hopper, a new card is concurrently advanced from the stack of new cards and the card carriage returns to receive the new card. This new card arrives in position to receive punching in its first column, and punching may thereupon be immediately effected while cam 29 continues through its second half revolution to return the ejector jaws 16 and the picker carriage rack 19.

A spring pressed detenting lever 74 (Fig. 3) is provided to resiliently hold the cam 29 and link 41 in home position by engagement with the pivot pin 40.

The punching mechanism

Referring to Fig. 5, depression of any one of the ten digit representing keys 1 to 9 or 0 (see Fig. 1) designated 75 will rock a related bell crank 76a and shift slide 76 toward the left against a spring 77. The slide 76 is loosely guided at its right end so that the left end may be depressed to force a punch 15 downwardly. When the slide is advanced, its narrowed left end moves under a bail 78 pivoted at 79 and a notch in the slide also rocks a bail 80 pivoted at 81.

Depending from bail 80 (Fig. 9) is a hook 82 which is elevated by rocking of the bail and closes a pair of contacts 83. These contacts effect energization of punch magnet 84 which attracts its armature 85 and through link 86 bell crank 87 and arm 88 rocks the punch bail 78 about its pivot 79, so that the advanced interposer is depressed at its left end and the related punch 15 forced downwardly through the card.

Armature 85 is connected to a toggle 89 which is straightened upon energization of magnet 84 and serves as a limiting means for the armature movement. Spring 90 breaks the toggle and restores the several connected links upon deenergization of magnet 84. The bail 78 in returning, engages a lip at the upper extremity of punch 15 and assists in restoring the punch. The link 86 (Fig. 9) has a finger 91 which, when the link is drawn to the right, disengages the hook 82 from contacts 83 so the latter will open again and break the circuit of magnet 84.

Figure 21:
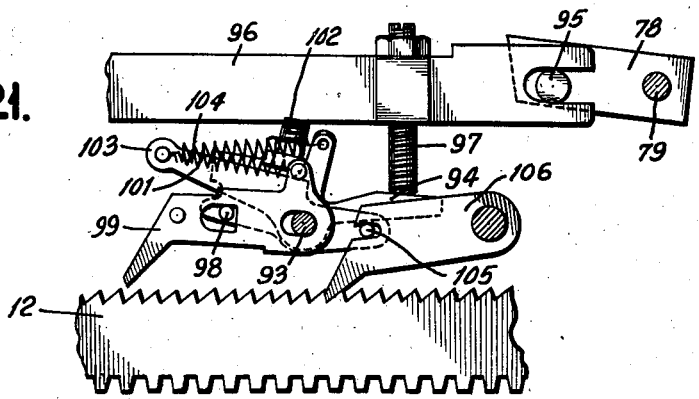
Fig. 21 is a further detail of the escapement mechanism.

*Escapement mechanism.*—Referring to Fig. 21 (which looks in the opposite direction to Fig. 5), the punch bail 78 carries a pin 95 at one end thereof which, when the bail is operated to actuate the punches, will depress a special interposer 96 whose mounting is similar to that of the punch interposers 16. The interposer 96 carries an adjustable screw 97 resting upon a member 94 secured on the rod 93 (see also Figs. 16 and 20). Member 94 carries a pin 98 that extends into a slot of the escapement stepping pawl 99 which normally holds the card carriage rack 12 as shown in Fig. 17. Thus, the operation of the punch bail will through the connections traced directly lift the pawl 99 out of engagement with rack 12 from the position of Fig. 17 to that of Fig. 21.

Pawl 99 is loosely pivoted on rod 93 as through the elongated slot indicated, so that, when the pawl is rocked out of engagement with the rack, a spring 101 will shift the pawl slightly toward the left as viewed in Figs. 17 and 21 so that, when it next descends, it will be in position to engage the next following ratchet tooth in the upper edge of the card carriage rack 12. The member 94 also carries a stud 102 which engages a member 103, and there is also a spring connection 104 between the members 103 and 94 so that, when member 94 is rocked clockwise as viewed in Fig. 21, spring 104 will urge the member 103 to rock in the same direction so that a pin 105 on the latter member extending into a notch of holding pawl 106 will rock the pawl into engagement with a tooth on rack 12. Thus, whenever the punch bail 78 is rocked, pawl 106 is lowered into engagement with rack 12 to hold it in position while punching takes place, and pawl 99 is lifted out of engagement with the rack.

Upon return movement of the parts, pawl 99 moves to engage the next following tooth and the holding pawl 106 is again lifted out of engagement with the rack.

*Space key operation.*—The member 94 is secured on the rod 93 and the rod 93 at its opposite end (see Fig. 16) has secured thereto a collar 107 (see also Fig. 6). When the space key 75S is depressed, it rocks its related bell crank 76a and interposer 76. The interposer 76 at its forward end is notched to engage a lever 108 which is loosely pivoted on shaft 93. Rocking of the lever will engage a lug 109 projecting laterally from the collar 107 so that depression of the space key 75S will effect a rocking of shaft 93 which in turn rocks the member 94 and effects an escapement action as already described.

*X key operation.*—The depression of the X key 75 (Fig. 1) will effect punching in the same manner as one of the digit keys and escapement will follow in the same way. In addition to these functions, the X key may effect an escapement of a greater distance than the columnar spacing on the card. This is brought about as follows: when the related interposer 76 is depressed by the punch bail 78, it engages and rocks a member 110 (see Figs. 16 and 20) which has a depending finger 111 which rocks a T lever 112 counterclockwise about a pin 113. The right end of lever 112 has pivoted thereto the so-called "skip" lifter 114 which is thus moved in a direction toward the rack 12, and in the usual manner an inclined surface near the forward end of the skip lifter will coact with the skip bar 115 and the stepping pawl 99.

When the X key is depressed with a high portion of the skip bar 115 in line therewith, the skip lifter acts as a wedge between the pawl 99 and the high portion of the bar, with the result that the bar 12 is free to move uninterruptedly toward the right, as viewed in Fig. 17, until a low portion designated 115a is in line with the skip lifter and permits the same to drop down and allow the pawl 99 to reengage the rack 12. If the X key is operated when a low portion of the skip bar 115 is in line with it, only the usual single column spacing takes place and the movement of the skip lifter in such position has no effect. The lever 112 (Fig. 16) is pivoted at 116 to short lever 117 to form a toggle which is resiliently held in position by a leaf spring 118 bearing at the point of connection 116. When the X key is depressed, this toggle is broken by the shifting of pin 116 upwardly as viewed in Fig. 16 and the parts remain in that position until one of the keys other than the X key is next operated.

Figure 20:
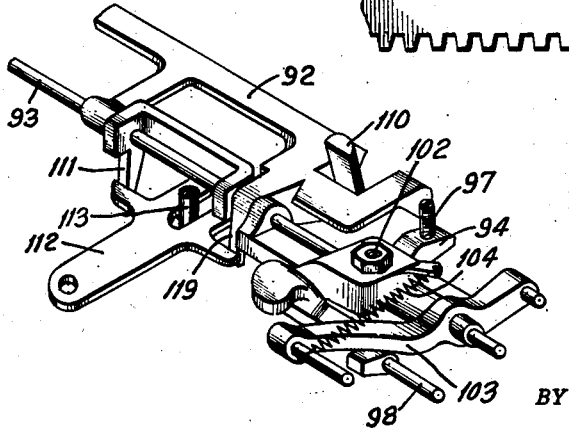
Fig. 20 is a perspective view of certain escapement operating connections.

When any other key is operated, the related interposer will depress the bail 92 which is loose on rod 93 (see also Fig. 20). This bail has a depending finger 119 which engages the other arm of lever 112 to rock the toggle and the interposer 114 back to the position of Fig. 16.

*Release key.*—When the release key designated 75R (Figs. 1 and 18) is depressed, it rocks the lever 120 to draw a slide 121 toward the right, whereby the camming edge 122 cooperating with a fixed part of the machine will cause the left end of the slide to rise as it is drawn toward the right. The lever lies directly under the skip lifter 114 and will accordingly elevate it together with the stepping pawl 99. As a result, the carriage rack 12 is released and under the influence of its actuating spring will advance toward its last column position without interruption. When it reaches such position, an extension 123 on the rack will strike the left end of slide 122 and return it to the position of Fig. 18.

*Last column contacts.*—Attached to the rack 112 (Fig. 2) is a projection 124 which, when the rack is in its last column position, will engage a lever 125 to rock the same and close a pair of so-called "last column" contacts designated 126 and open a second pair designated 127.

*Floating cam contacts.*—Referring to Figs. 17 and 17a, the rod 93 carries a block 128 which is freely mounted on the rod. On the block there is pivoted a member 129 to which is connected a spring 130. The spring serves to urge the member counterclockwise and also serves to draw the member toward the left. When the pin 98 is elevated to effect an action of the escapement mechanism, it also engages the lower edge of the member 129 and rocks the same from the position in Fig. 17 to that of Fig. 17a with a pin 131 in the pawl 99 acting as a limit stop toward the left. Referring to Fig. 5, it was explained that when another interposer is advanced toward the left as viewed in this figure, the bail 80 was dropped causing the rocking of the rod 81. This rod 81 as viewed in Fig. 17 (which looks in the opposite direction to Fig. 5) has secured thereon an element 132 so that, when an interproser is advanced, the element 132 is rocked from the position in Fig. 17 to that of Fig. 17a. At such time the punch bail has not been operated, so that the member 129 is still in the position of Fig. 17 and blocks the movement of an element 133.

The element 133 is loose on the rod 81 and has a spring connection 134 with the element 132 so that, when the escapement action is subsequently effected and member 129 elevated as in Fig. 17a, the element 133 under the influence of spring 134 will snap into the position shown where it lies under the member 129. The member 129 through an insulating extension thereon rocks the lever 135 to effect opening of the so-called "floating" cam contacts designated 136. Through this arrangement the floating cam contacts are open as soon as the pawl 99 is out of engagement with the rack 12, and the elements 132 and 133 serve to hold the contacts open until the punch interposer has fully returned to its home position.

*Duplicating card.*—The operation of the punches 15 may also be controlled by means of the duplicator which causes selector magnets 137 (Fig. 5) to be actuated in accordance with the perforations of a previously punched master card. The selector magnets 137 are twelve in number and operate the ten numeral keys, the X key and the key which controls punching in the 12 position. Energization of any of the magnets will attract its related armature 138 (Fig. 5) and rock a pivoted lever 139 whose free end bears on a shoulder of the key stem and thereby depresses the same when the magnet is energized.

Figure 19:
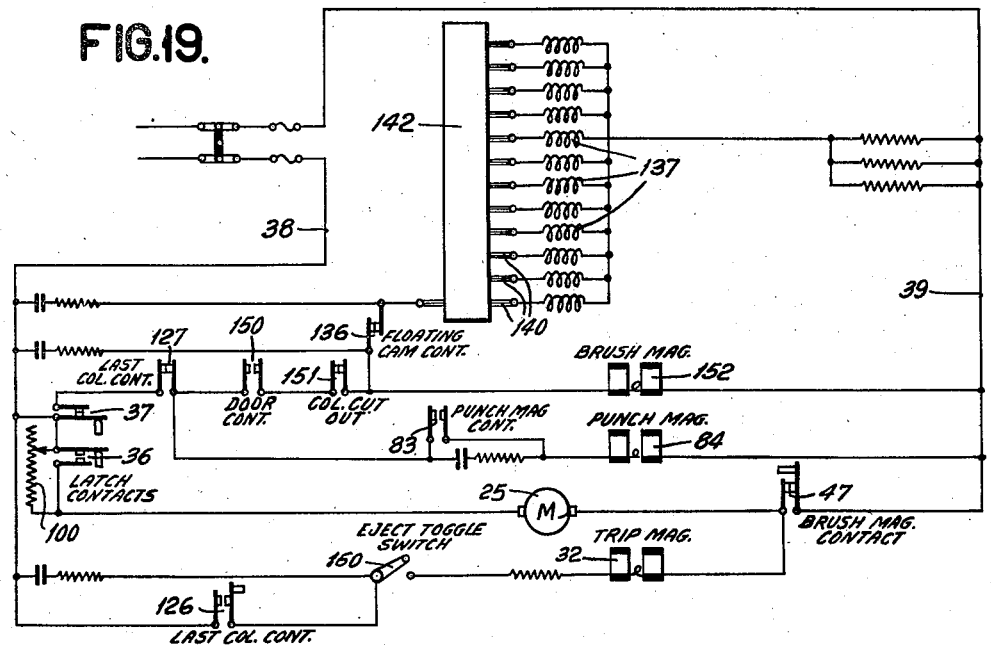
Fig. 19 is a wiring diagram of the electric circuits of the machine.

Magnets 137 are electrically connected to reading brushes 140 (see Fig. 19). These brushes as seen in Fig. 7 are carried in a block 141 of insulating material. The brushes are adapted to bear against a metal cylinder or roller 142 which is carried by a shaft 143 in a pivoted door designated 144. Between the roller 142 and the brushes 140 is positioned the preperforated master card designated M which is moved back and forth over the brushes by end guides 145 and 146. These guides are connected to the card carriage rack 12 (see Figs. 1 and 11) so that the card M travels back and forth with the card carriage. When the perforations of the master card M are to control the operation of the punches, the door 144 is closed to the full line position shown in Fig. 7 where a spring pressed latch 147 engages and holds it in such position. A stud 148 is arranged to engage a post 149 through which a pair of contacts 150 are closed. When the contacts are closed, a circuit is completed which may be traced in Fig. 19 from line 38, contacts 37, last column contacts 127, door contacts 150, a pair of so-called "column cut-out" contacts 151, brush magnet 152 to opposite line 39.

The brush magnet is shown in Fig. 7. When energized it attracts its armature 153 which has an adjustable link connection 154 to the lever 155 pivoted at 156 upon which the brush block 144 is carried. The connection is such that, when the magnet is energized, the brushes are rocked into engagement with the underside of the card and, as it passes over the brushes in the direction toward the left, the brushes will make contact through the perforations. When armature 153 is attracted, a downward extension thereon will engage and open a pair of contacts designated 47 which serve as an interlock in the circuit arrangement.

*Column cut-out.*—The card carriage may be manually shifted toward the right or in a reverse direction from that in which it escapes by pressing against a finger piece 157 (Figs. 1 and 12). This finger piece is pivotally mounted on a cross bar 158 carried by the rack 12 so that the latter is manually returned. When the finger piece 157 is depressed, a short arm thereon designated 159 in Fig. 1 is rocked counterclockwise as viewed in this figure. From the arm a pin 160 extends downwardly (see Fig. 12) in which figure the movement of the arm will cause the pin 160 to be moved toward the left against a plate 161 which is pivoted at 162 (see also Fig. 8).

This plate, when thus rocked, will cause opening of the so-called "column cut-out" contacts 151 through reaction of a finger extending downwardly from the plate 161. The opening of the contact 151 will cause deenergization of the brush magnet 152 and is for the purpose of causing the brushes 140 (Fig. 7) to be lowered whenever the carriage with the master card M therein is moved toward the right to prevent damage of the brushes.

*Circuit diagram*

The circuit diagram will now be briefly explained to show the manner in which the various mechanical elements are coordinated. Assuming the card in the first column punching position and a perforated master card in the duplicator section, the door contacts 159 will be in closed position. The operation of any punch key then will cause operation of the interposer bail 80 to close the punching contacts 83 so that a circuit is completed from line 38, contacts 37, 127 and 83, through the punch magnet 84 to line 39. This results in punching the selected position in the card column and the incidental escapement of the card carriage to present the next column. Successive punch key operations will in the same manner punch the columns and escape the card to the next higher positions. If, when any card column reaches the punching position, there is a perforation in the master card in the corresponding column, a circuit is automatically completed from line 38, contacts 37, 127, 150, 151, and 136, to the contact roll 142, hole in the master card, the related brush 140, and magnet 137 to line 39.

The magnet, of course, operates the related key and punching action takes place as before with the incidental opening of the floating cam contacts 136, until the punch interposer has been fully restored. When the card arrives at the last column position, the last column contacts 127 open, breaking the circuit to the brush magnet 152 so that the brushes drop out of engagement with the master card. At the same time the second set of last column contacts 126 close and, if the switch 160 has previously been closed, the circuit through the trip magnet 32 which has already been traced will be completed. The contacts 47 insure that this trip magnet will not be energized until the brushes have moved out of contact with the card to insure that there is no return movement of the carriage while the brushes are in engagement therewith.

The magnet 32, as already explained, closes contacts 36 and opens contacts 37, the latter contacts serving to cut off current from the card sensing brushes, the brush magnet and the punching magnet, while the former short circuit the restorer 100, so that the motor 125, to which the carriage return mechanism is now coupled, will return the carriage and eject the punched card while feeding in a new card. Where a fully automatic operation is not desired, the switch 160 is left open, and in such event the operation of the machine simply comes to rest when the card reaches its last column position. The operator may then close the switch and operation will proceed automatically from there on.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record card punching machine, a set of punches, a card carriage adapted to carry a card step by step past said punches, a supply hopper, a second carriage for advancing a card from said supply hopper to said card carriage, ejecting means for removing the card from the card carriage, power operating means, and devices controlled thereby for effecting a concurrent operation of the ejecting means and of the second carriage to effect the advance of a new card to the carriage while a previous card is ejected therefrom.

2. In a record card punching machine, the combination of a card carriage carrying a card adapted to be punched in card columns successively, keys for controlling card punching operations, a power driven means for returning said carriage, power driven means for ejecting the card from the carriage and means controlled by the carriage upon its advance to a predetermined position for concurrently setting both power driven means in operation to eject the card while the carriage is returned.

3. The invention set forth in claim 2 in which manually settable means is provided and settable to prevent the operation of the carriage controlled means when the carriage is in the said predetermined position, said settable means being operable to subsequently set said power operated means in operation.

4. In a punching machine including a carriage adapted to carry a card transversely with respect to a set of punches for punching in card columns successively, a card ejecting mechanism, a carriage returning mechanism, a driving means common to both said mechanisms, and means including a device operable by the carriage when the last card column is in punching position for causing said driving means to operate said ejecting and carriage returning mechanisms concurrently.

5. In a punching machine including a carriage adapted to carry a card transversely with respect to a set of punches for punching in card columns successively, a supply hopper, mechanism for feeding a card from the hopper to said carriage, mechanism for ejecting the card from said carriage, power operating means common to both said mechanisms, and means effective when a predetermined card column is in register with the punches for causing said power means to effect a concurrent operation of said ejecting and feeding mechanisms.

6. In a punching machine of the class described, a card carriage rack, and mechanism for effecting a reciprocation thereof comprising a driving shaft, an operating motor, a driven element, clutch devices for coupling said driven element to the shaft for one revolution, a pivoted gear sector, an eccentric pin on said driven element, a link connection between the pin and gear sector to oscillate the sector during a revolution of the shaft and connections between the sector and carriage rack to translate said oscillation into reciprocation of the rack.

7. The invention set forth in claim 6 in which said driving motor operates the driving shaft continuously at a normal rate of speed, and a device operated by said one revolution clutch and controlled by the driven element to cause the motor to drive said shaft at a higher than normal speed for a portion of a revolution to feed the rack at a faster rate during such portion of the revolution.

8. The invention set forth in claim 6 in which an electrical resistance is wired in series with the motor and the motor speed is normally controlled thereby, a pair of contacts arranged to cut out said resistance and cause the motor to operate at a higher speed, said clutch devices upon operation causing closure of the contacts and said driven element causing reopening thereof after a part of a revolution.

9. In a punching machine of the class described, a card ejecting mechanism comprising a pair of jaws between which a card to be ejected is fed, said jaws being pivoted to swing the card through an arc to a position above a hopper, means for swinging the jaws, a pivoted pusher member located to push the card out of said jaws when the jaws are swung over the hopper and a cam element directly carried by one of the jaws to directly actuate the pusher member near the end of the swinging movement of the jaws.

SAMUEL BRAND.
JAMES M. CUNNINGHAM.